UNITED STATES PATENT OFFICE.

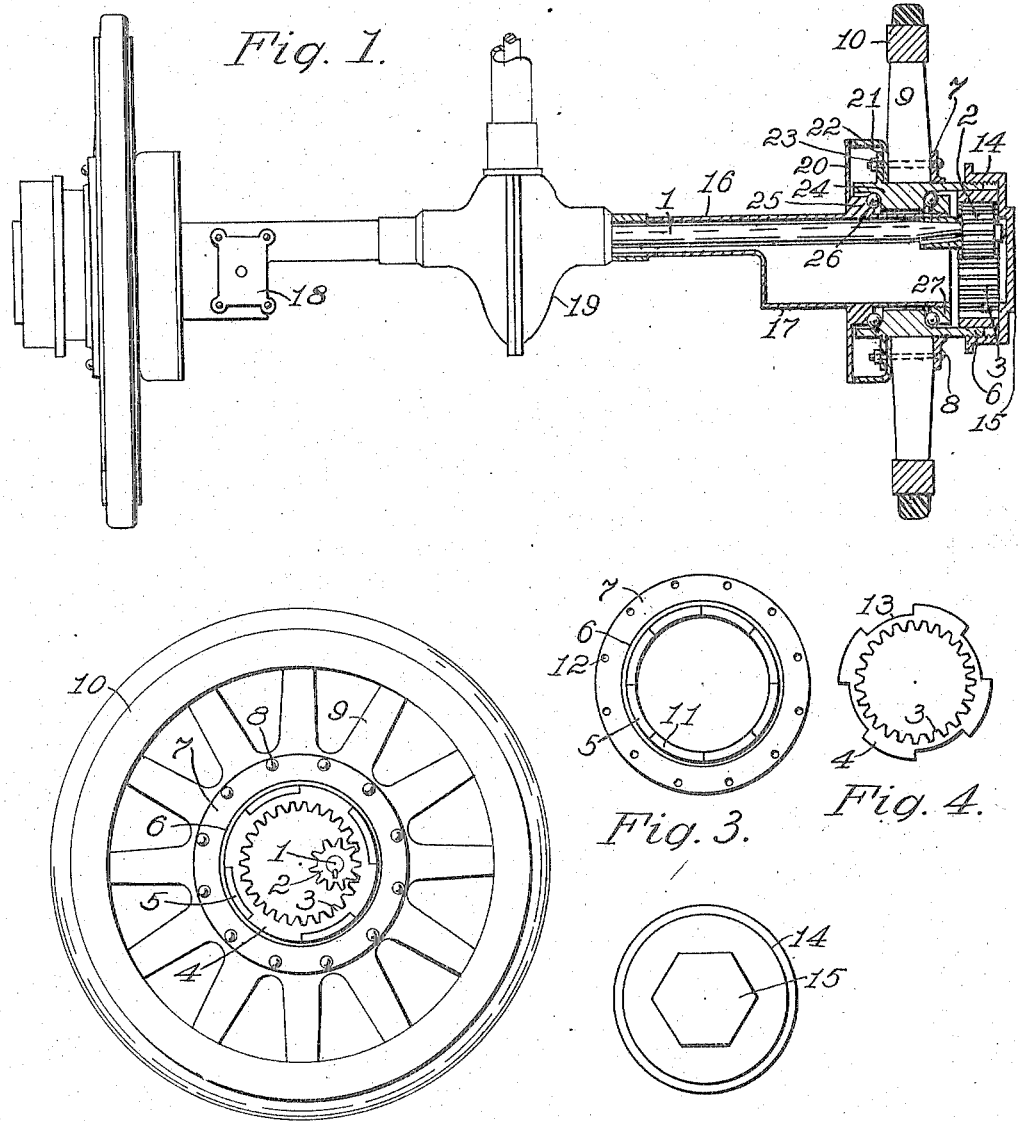

KARL J. UNGER, OF WATERLOO, IOWA.

DRIVING MECHANISM.

1,283,985.  Specification of Letters Patent.  Patented Nov. 5, 1918.

Application filed September 19, 1917. Serial No. 192,186.

*To all whom it may concern:*

Be it known that I, KARL J. UNGER, a citizen of the Republic of Russia, and a resident of Waterloo, Blackhawk county, Iowa, have invented certain new and useful Improvements in Driving Mechanism, of which the following is a specification.

My invention relates to improvements in drive mechanism, and the object of my improvement is to provide for driving-axles of self-propelled vehicles, particularly that type known as "motor-trucks", driving mechanism for rotating the drive-wheels with enhanced power.

This object I have accomplished by the mechanism which is hereinafter described and claimed, and which is illustrated in the accompanying drawings, in which Figure 1 is a plan view of a sectional housed driving-axle, connected for differential rotation, with traction-wheels on the axle-sections actuated by my improved driving-mechanism, parts being shown in longitudinal horizontal section; Fig. 2 is an elevation of the outer face of one of the driving or traction-wheels, with hub-cap removed; Fig. 3 is an elevation of the outer end of the hub-casting and removable ring; Fig. 4 is an elevation of the detachable internal-gear wheel of said device, and Fig. 5 is an elevation of the hub-cap.

Similar numerals of reference denote corresponding parts throughout the several views.

Referring to Fig. 1, the numeral 1 denotes one of two alined axle-sections connected for differential rotation by differential gearing placed in a housing 19. The axle-housing, which ordinarily covers almost the entire length of each axle-section 1, is for most of the length of the section omitted. I have supplied an axle-housing 16 to take the place of the housing part removed, and this housing 16 is expanded at 17 in its outer part, and carried nearly to the outer end of the axle. The traction-wheel 10 has its spokes 9 mounted on a hub-casting 24 of relatively large diameter. This hub has an integral annular flange 22 engaging the inner faces of the spokes 9, and a flat ring 7 is removably fitted upon the hub, both the ring 7 and the spokes 9 and flange 22 having registering orifices, as indicated at 12 in Fig. 3, to receive bolts 8, secured by means of nuts 23. Between the flange 22 and the spokes 9 is engaged the annular flat web of a friction-brake drum 21, also secured by said bolts to the spokes.

The enlarged part 17 of the axle-housing 16 is carried into the hollow of the hub 24, and has a wide integral annular plate 20 which closes the open end of the friction-drum 21. Said housing has an enlargement 25, and the hub an inwardly thickened annulus 24 between which is a raceway for anti-friction balls 26. An annulus 27 is threaded interiorly and mounted on the exteriorly-threaded extremity of the housing, a raceway being provided between the annuli 24 and 27 for other anti-friction balls.

Upon the enlarged part 17 of each axle-housing 16 may be formed a spring-perch or seat 18, upon which may be secured and supported a spring and superincumbent frame not shown. The hub-casting 24 extends outwardly from the wheel 10, and has its outer end exteriorly threaded to receive an interiorly threaded hub-cap 14.

Referring now to Figs. 2 to 4, inclusive, the outer end 6 of the axle-housing 17 has segmental recesses 11 between raised segmental parts 5. The numeral 3 denotes an internal-gear ring having peripheral segmental projections 4 separated by segmental recesses 13, and the projections 4 of this gear-ring fit removably the recesses 11 of the housing end 6 between and engaging the projections 5 of the latter the gear-ring thus being held from rotation or displacement relative to the hub-casting, as also by the engagement of the hub-cap 14, the latter having a hexagonal boss 15 for engagement by a wrench.

A pinion 2 is keyed on the coned outer end of the axle-part 1, and is in mesh with said internal-gear ring 3.

It will be evident that a positive rotation of the axle-section 1 will cause the rotation of the wheel 10 by means of the relative interaction of the pinion 2 and internal-gear ring 3, at a relatively low speed, but with a gain in driving-power. In my improved device, I have produced a convenient assemblage of the driving parts, with great accessibility, and having the advantage of being able to mount the parts on any driving-axle section of any description of said-propelled vehicle.

In case any axle-housing 19 has an extension inclosing the major part of the axle-section, a portion of said housing may be cut away or otherwise removed to permit the housing 16 to be mounted about the outer part of the axle according to my invention, with my specially designed wheel 10 and enlarged hub 24 mounted about the enlarged part 17 of the housing as above described. It will be seen that since the internal gear ring 3 and pinion 2 are located at the outer face of the wheel 10, either may be quickly removed or replaced without displacing the wheel, for purposes of repair, substitution or lubrication as may be expedient from time to time. When the gearing is located at the inner end of the wheel-hub, the wheel must be removed in order to inspect or remove parts of the gearing, or properly lubricate them.

Having described my invention, what I claim as new, and desire to secure by Letters Patent, is:

1. Driving mechanism, comprising a driven wheel, a driving axle, said wheel having a hollow hub member, a housing for said axle having an enlarged end portion mounted within the hollow of said hub, the outer end of the said hub member having engaging-means, an internal gear-ring having engaging-means detachably engaged with the engaging-means on said hub-member, a pinion mounted on said axle and in mesh with said internal-gear ring, and means for removably retaining said internal gear ring in engagement with said hub-member consisting of a hub-cap detachably mounted on said hub-member and compressed upon said engaging-means.

2. Driving mechanism, comprising a driven wheel, a driving axle, said wheel having a hollow hub-member exteriorly-threaded on its outer end, a driving axle, a housing for said axle extending into said hub member, the outer end of the hub member having segmental recesses, an internal-gear ring having segmental projections receivable into and engaged with the segmental recesses of the hub-member, and means for removably securing said gear-ring in engagement with said hub-member consisting of an interiorly-threaded hub-cap mounted removably on the exteriorly threaded end of said hub-member and engaging the end thereof and also said segmental projections to retain said integral-gear ring in place.

Signed at Waterloo, Iowa, this 4th day of Sept. 1917.

KARL J. UNGER.